United States Patent
Chen et al.

(10) Patent No.: US 9,502,914 B2
(45) Date of Patent: Nov. 22, 2016

(54) CHARGING APPARATUS FOR RECOGNIZING ADAPTOR AND CHARGING METHOD FOR RECOGNIZING ADAPTOR

(71) Applicant: Chicony Power Technology Co., Ltd., New Taipei (TW)

(72) Inventors: Huang-Ying Chen, New Taipei (TW); Ming-Ho Huang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 139 days.

(21) Appl. No.: 14/530,462

(22) Filed: Oct. 31, 2014

(65) Prior Publication Data

US 2016/0126770 A1   May 5, 2016

(51) Int. Cl.
*H02J 7/00* (2006.01)
*H02J 7/02* (2016.01)

(52) U.S. Cl.
CPC .............. *H02J 7/0052* (2013.01); *H02J 7/007* (2013.01); *H02J 7/025* (2013.01); *H02J 50/10* (2016.02); *H02J 7/0042* (2013.01); *H02J 2007/0062* (2013.01)

(58) Field of Classification Search
CPC ..... Y02E 60/12; H02J 7/0042; H02J 7/0045; H02J 2007/0062; H01M 10/46; H01M 10/44
USPC ........................................................ 320/107
See application file for complete search history.

(56) References Cited

U.S. PATENT DOCUMENTS

| | | | | |
|---|---|---|---|---|
| 2003/0206547 A1* | 11/2003 | Cho | ..................... | G06K 7/0008 370/364 |
| 2005/0010699 A1* | 1/2005 | Hung | ..................... | G06F 13/385 710/14 |
| 2006/0273764 A1* | 12/2006 | Huang | .................. | H02J 7/0004 320/151 |
| 2006/0284595 A1* | 12/2006 | Hsieh | ..................... | H02J 7/0077 320/115 |
| 2012/0112690 A1* | 5/2012 | Stulen | .............. | A61B 17/00234 320/108 |

* cited by examiner

*Primary Examiner* — Arun Williams
(74) *Attorney, Agent, or Firm* — Muncy, Geissler, Olds & Lowe, P.C.

(57) ABSTRACT

A charging apparatus for recognizing an adaptor is applied to an alternating current to direct current adaptor. The charging apparatus includes an input side universal serial bus interface, a data voltage detection unit, a microcontroller and a first charging power output unit. The data voltage detection unit detects a kind of the alternating current to direct current adaptor. The microcontroller determines an overall output charging power of the charging apparatus according to the kind of the alternating current to direct current adaptor. The microcontroller is configured to control the first charging power output unit to output the overall output charging power to a first battery.

10 Claims, 7 Drawing Sheets

CHARGING APPARATUS FOR RECOGNIZING ADAPTOR AND CHARGING METHOD FOR RECOGNIZING ADAPTOR

BACKGROUND OF THE INVENTION

1. Field of the Invention

The present invention relates to a charging apparatus and a charging method, and especially relates to a charging apparatus for recognizing an adaptor and a charging method for recognizing an adaptor.

2. Description of the Related Art

FIG. 1 shows a block diagram of the application of the related art battery charging apparatus. An alternating current power supply apparatus 20 sends an alternating current power 202 to a related art alternating current to direct current adaptor 32. The related art alternating current to direct current adaptor 32 converts the alternating current power 202 to obtain a bus voltage 206 (for example, 5 volts). The related art alternating current to direct current adaptor 32 sends the bus voltage 206 to a related art battery charging apparatus 60 through a universal serial bus interface 308, and then the related art battery charging apparatus 60 charges a battery 70.

The universal serial bus interface 308 comprises a bus voltage contact (not shown in FIG. 1), a data positive contact (not shown in FIG. 1), a data negative contact (not shown in FIG. 1) and a ground contact (not shown in FIG. 1). The bus voltage 206 is sent to the related art battery charging apparatus 60 through the bus voltage contact.

When the related art alternating current to direct current adaptor 32 is manufactured, the manufacturer arranges some circuits at the data positive contact and the data negative contact, so that the data positive contact and the data negative contact have a specific voltage level or a short circuit for recognizing whether the related art alternating current to direct current adaptor 32 is manufactured by a specific manufacturer or not.

For examples, a first manufacturer sets that the data positive contact is 2 volts and the data negative contact is 2.7 volts. A second manufacturer sets that the data positive contact is 2.7 volts and the data negative contact is 2 volts. A third manufacturer sets that the data positive contact is 2.7 volts and the data negative contact is 2.7 volts. A fourth manufacturer sets that the data positive contact and the data negative contact have a short circuit. A signal of the data positive contact is a pull low signal and a signal of the data negative contact is a pull low signal if the bus voltage 206 is sent from a computer.

Therefore, the related art battery charging apparatus 60 does not work (does not charge the first battery 40) even if the related art alternating current to direct current adaptor 32 is connected to the related art battery charging apparatus 60 when the manufacturer of the related art alternating current to direct current adaptor 32 is different from the manufacturer of the related art battery charging apparatus 60.

Or, the related art battery charging apparatuses 60 of some manufacturers can still work even if the manufacturer of the related art alternating current to direct current adaptor 32 is different from the manufacturer of the related art battery charging apparatus 60. However, the output charging power of the related art battery charging apparatus 60 is constant. It is a big problem.

Different related art alternating current to direct current adaptors 32 has different specifications and performance. Therefore, when the manufacturer of the related art alternating current to direct current adaptor 32 is different from the manufacturer of the related art battery charging apparatus 60 and the related art alternating current to direct current adaptor 32 supplies power to the related art battery charging apparatus 60, the related art battery charging apparatus 60 shall output different charging power to charge the battery 70, so that the related art battery charging apparatus 60 is protected and the battery 70 is charged safely. However, the output charging power of the related art battery charging apparatus 60 is constant no matter what the related art alternating current to direct current adaptor 32 is.

SUMMARY OF THE INVENTION

In order to solve the above-mentioned problems, an object of the present invention is to provide a charging apparatus for recognizing an adaptor.

In order to solve the above-mentioned problems, another object of the present invention is to provide a charging method for recognizing an adaptor.

In order to achieve the object of the present invention mentioned above, the charging apparatus is applied to an alternating current to direct current adaptor and a first battery. The charging apparatus comprises an input side universal serial bus interface, a data voltage detection unit, a microcontroller and a first charging power output unit. The input side universal serial bus interface comprises an input side bus voltage contact, an input side data positive contact, an input side data negative contact and an input side ground contact. The data voltage detection unit is electrically connected to the input side universal serial bus interface. The microcontroller is electrically connected to the data voltage detection unit. The first charging power output unit is electrically connected to the input side universal serial bus interface, the microcontroller and the first battery. The alternating current to direct current adaptor sends a bus voltage to the input side universal serial bus interface. The input side universal serial bus interface sends the bus voltage to the first charging power output unit. The data voltage detection unit detects a data positive contact voltage condition of the alternating current to direct current adaptor through the input side data positive contact. The data voltage detection unit detects a data negative contact voltage condition of the alternating current to direct current adaptor through the input side data negative contact. The data voltage detection unit informs the microcontroller of the data positive contact voltage condition and the data negative contact voltage condition. The microcontroller determines an overall output charging power of the charging apparatus according to the data positive contact voltage condition and the data negative contact voltage condition. The microcontroller is configured to control the first charging power output unit to output a first charging power to the first battery after the first charging power output unit receives the bus voltage. The first battery is charged with the first charging power. The first charging power is equal to the overall output charging power.

In order to achieve another object of the present invention mentioned above, the charging method is applied to an alternating current to direct current adaptor and a first battery. The charging method comprises following steps. An input side universal serial bus interface is provided. The input side universal serial bus interface comprises an input side bus voltage contact, an input side data positive contact, an input side data negative contact and an input side ground contact. A data voltage detection unit electrically connected to the input side universal serial bus interface is provided. A microcontroller electrically connected to the data voltage detection unit is provided. A first charging power output unit electrically connected to the input side universal serial bus interface, the microcontroller and the first battery is provided. The alternating current to direct current adaptor sends a bus voltage to the input side universal serial bus interface. The input side universal serial bus interface sends the bus voltage to the first charging power output unit. The data voltage detection unit detects a data positive contact voltage condition of the alternating current to direct current adaptor through the input side data positive contact. The data voltage detection unit detects a data negative contact voltage condition of the alternating current to direct current adaptor through the input side data negative contact. The data voltage detection unit informs the microcontroller of the data positive contact voltage condition and the data negative contact voltage condition. The microcontroller determines an overall output charging power according to the data positive contact voltage condition and the data negative contact voltage condition. The microcontroller is configured to control the first charging power output unit to output a first charging power to the first battery after the first charging power output unit receives the bus voltage. The first battery is charged with the first charging power. The first charging power is equal to the overall output charging power.

The advantage of the present invention is to recognize the kind of the alternating current to direct current adaptor to determine the overall output charging power of the charging apparatus. Different kinds of alternating current to direct current adaptors have different specifications and performance. Therefore, when different kinds of alternating current to direct current adaptors supply power to the charging apparatus, the charging apparatus shall output different overall output charging power to charge the battery, so that the charging apparatus is protected and the battery is charged safely.

DETAILED DESCRIPTION OF THE INVENTION

Figure 1:
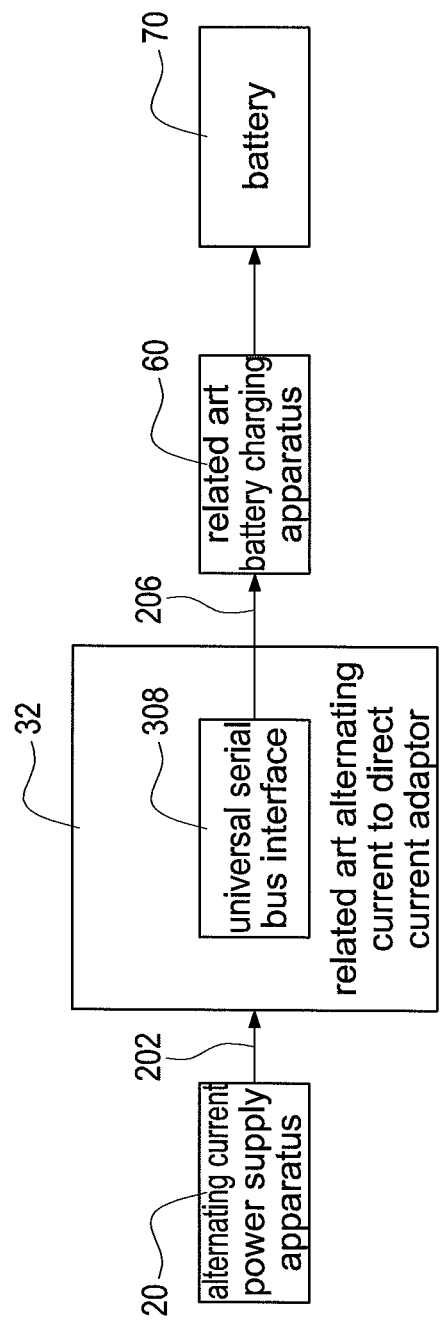
FIG. 1 shows a block diagram of the application of the related art battery charging apparatus.
Figure 2:
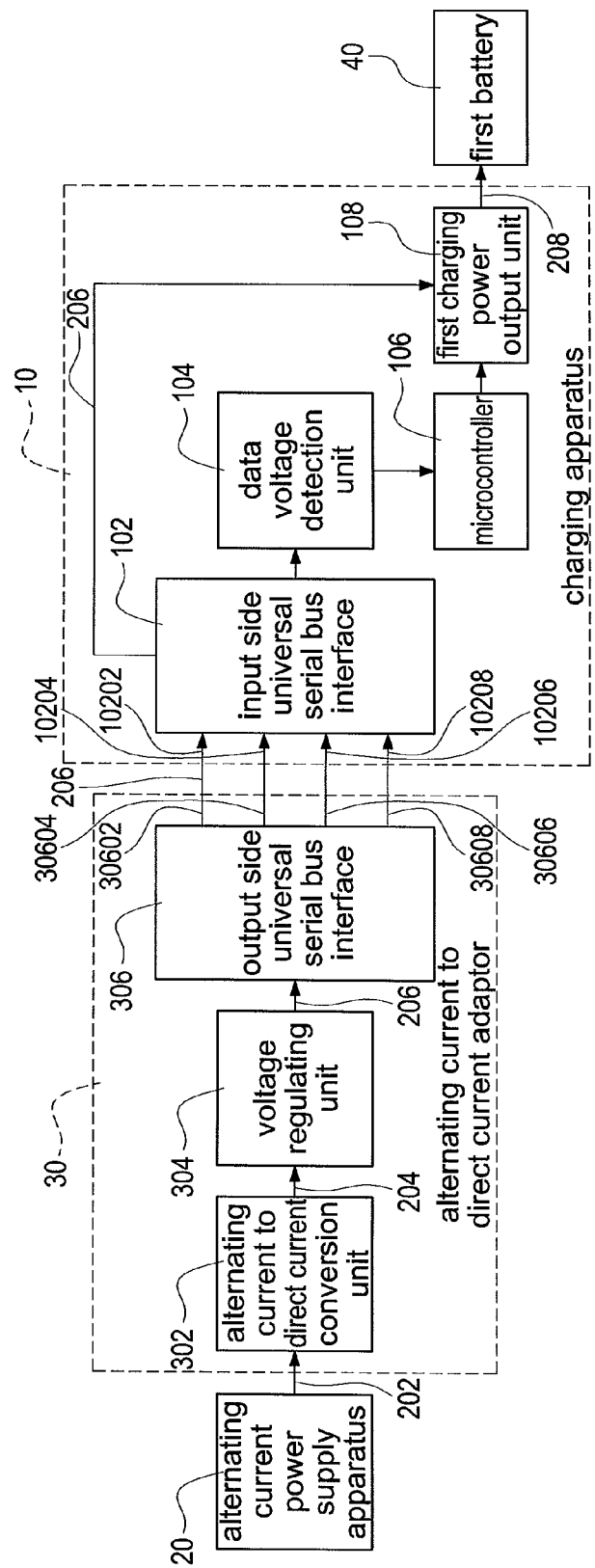
FIG. 2 shows a block diagram of the first embodiment of the charging apparatus of the present invention.

FIG. 2 shows a block diagram of the first embodiment of the charging apparatus of the present invention. A charging apparatus 10 for recognizing an adaptor (an alternating current to direct current adaptor 30) is applied to an alternating current power supply apparatus 20, the alternating current to direct current adaptor 30 and a first battery 40. The alternating current to direct current adaptor 30 comprises an alternating current to direct current conversion unit 302, a voltage regulating unit 304 and an output side universal serial bus interface 306. The output side universal serial bus interface 306 is a universal serial bus connector.

The alternating current to direct current conversion unit 302 is electrically connected to the alternating current power supply apparatus 20 and the voltage regulating unit 304. The output side universal serial bus interface 306 is electrically connected to the voltage regulating unit 304. The output side universal serial bus interface 306 comprises an output side bus voltage contact 30602, an output side data positive contact 30604, an output side data negative contact 30606 and an output side ground contact 30608.

The charging apparatus 10 comprises an input side universal serial bus interface 102, a data voltage detection unit 104, a microcontroller 106 and a first charging power output unit 108. The input side universal serial bus interface 102 comprises an input side bus voltage contact 10202, an input side data positive contact 10204, an input side data negative contact 10206 and an input side ground contact 10208. The input side universal serial bus interface 102 is a universal serial bus connector.

The input side bus voltage contact 10202 is electrically connected to the output side bus voltage contact 30602. The input side data positive contact 10204 is electrically connected to the output side data positive contact 30604. The input side data negative contact 10206 is electrically connected to the output side data negative contact 30606. The input side ground contact 10208 is electrically connected to the output side ground contact 30608.

The data voltage detection unit 104 is electrically connected to the input side universal serial bus interface 102. The microcontroller 106 is electrically connected to the data voltage detection unit 104. The first charging power output unit 108 is electrically connected to the input side universal serial bus interface 102, the microcontroller 106 and the first battery 40.

The alternating current power supply apparatus 20 sends an alternating current power 202 to the alternating current to direct current conversion unit 302. The alternating current to direct current conversion unit 302 converts the alternating current power 202 to obtain a direct current power 204. The alternating current to direct current conversion unit 302 sends the direct current power 204 to the voltage regulating unit 304. The voltage regulating unit 304 regulates the direct current power 204 to obtain a bus voltage 206 (for example, 5 volts). The voltage regulating unit 304 sends the bus voltage 206 to the output side universal serial bus interface 306.

The input side universal serial bus interface 306 sends the bus voltage 206 to the input side universal serial bus interface 102 through the output side bus voltage contact 30602 and the input side bus voltage contact 10202. The input side universal serial bus interface 102 sends the bus voltage 206 to the first charging power output unit 108.

The data voltage detection unit 104 detects a data positive contact voltage condition of the output side data positive contact 30604 through the input side data positive contact 10204. The data voltage detection unit 104 detects a data negative contact voltage condition of the output side data negative contact 30606 through the input side data negative contact 10206. The data voltage detection unit 104 informs the microcontroller 106 of the data positive contact voltage condition and the data negative contact voltage condition.

The microcontroller 106 determines an overall output charging power of the charging apparatus 10 according to the data positive contact voltage condition and the data negative contact voltage condition. The microcontroller 106 is configured to control the first charging power output unit 108 to output a first charging power 208 to the first battery 40 after the first charging power output unit 108 receives the bus voltage 206. The first battery 40 is charged with the first charging power 208. The first charging power 208 is equal to the overall output charging power.

The overall output charging power is 1 ampere when the data positive contact voltage condition is 2 volts and the data negative contact voltage condition is 2.7 volts. The overall output charging power is 2 amperes when the data positive contact voltage condition is 2.7 volts and the data negative contact voltage condition is 2 volts. The overall output charging power is 2.4 amperes when the data positive contact voltage condition is 2.7 volts and the data negative contact voltage condition is 2.7 volts. The overall output charging power is 0.5 ampere when the data positive contact voltage condition and the data negative contact voltage condition are short circuits.

The data positive contact voltage condition is a pull low signal and the data negative contact voltage condition is a pull low signal if the bus voltage 206 is sent from a computer (not shown in FIG. 2). Thus, the overall output charging power is 0.5 ampere.

Moreover, the relationship of the overall output charging power and the data positive contact voltage condition (the data negative contact voltage condition) is determined by a user. For example, in the embodiment mentioned above, the user is aware that the data positive contact voltage condition of the alternating current to direct current adaptor 30 manufactured by a first manufacturer is 2.7 volts and the data negative contact voltage condition is 2.7 volts. The user thinks that the specification and performance of the alternating current to direct current adaptor 30 manufactured by the first manufacturer is better. Therefore, the user sets the overall output charging power is 2.4 volts when the data positive contact voltage condition is detected as 2.7 volts and the data negative contact voltage condition is detected as 2.7 volts.

Moreover, the first charging power output unit 108 outputs 500 mA (0.5 A) to charge the first battery 40 when a voltage of the first battery 40 is between 1 volt to 2 volts. Then the first charging power output unit 108 outputs the first charging power 208 to charge the first battery 40 when the voltage of the first battery 40 is greater than 2 volts. Therefore, the first battery 40 is charged more safely.

The charging apparatus 10 activates the first battery 40 firstly when the voltage of the first battery 40 is less than 1 volt. Then the charging apparatus 10 charges the first battery 40.

Figure 6:
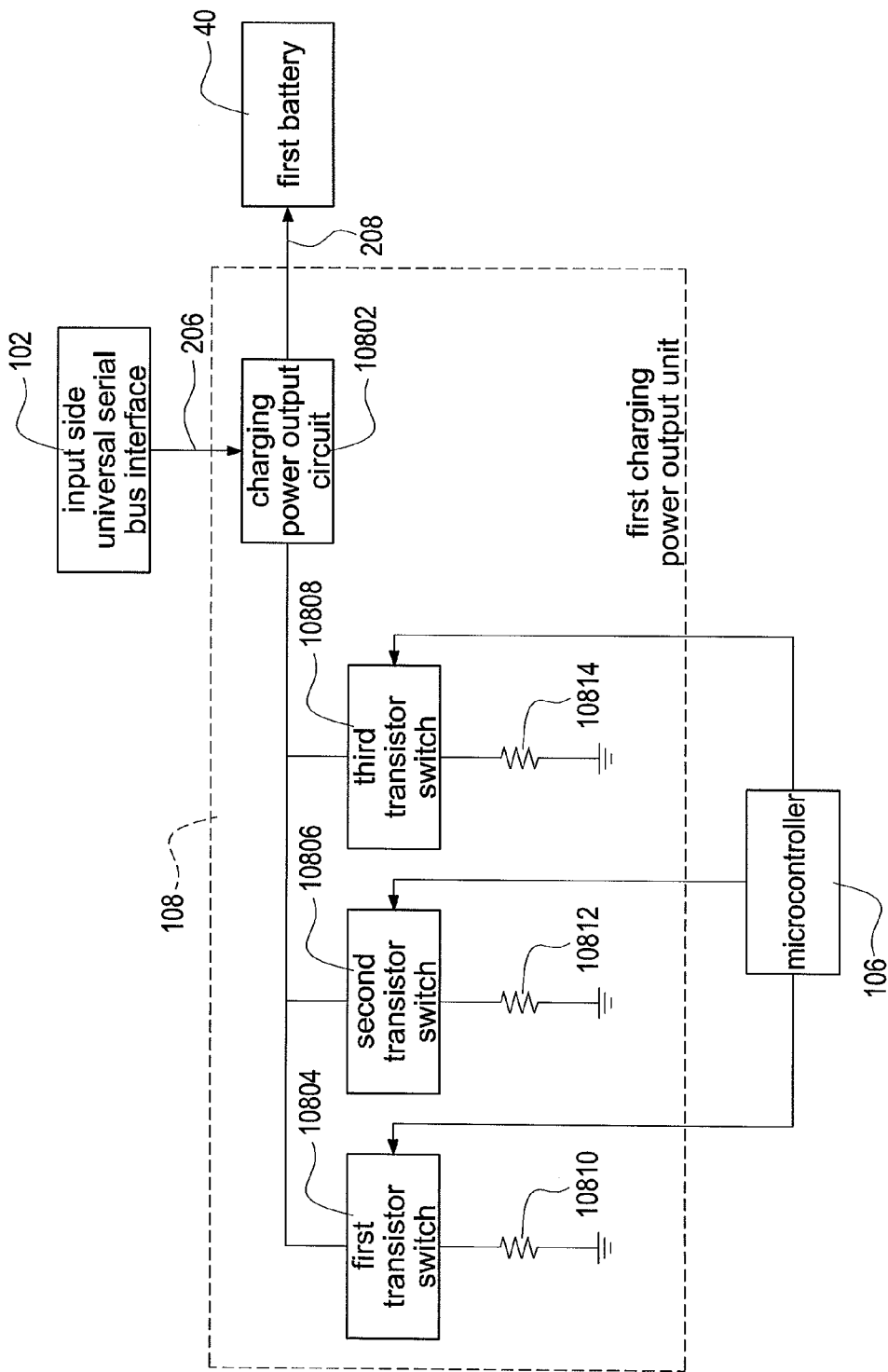
FIG. 6 shows a circuit diagram of an embodiment of the first charging power output unit of the present invention.

FIG. 6 shows a circuit diagram of an embodiment of the first charging power output unit of the present invention. The first charging power output unit 108 comprises a charging power output circuit 10802, a first transistor switch 10804, a second transistor switch 10806, a third transistor switch 10808, a first resistor 10810, a second resistor 10812 and a third resistor 10814.

The charging power output circuit 10802 is electrically connected to the input side universal serial bus interface 102 and the first battery 40. The first transistor switch 10804 is electrically connected to the charging power output circuit 10802 and the microcontroller 106. The second transistor switch 10806 is electrically connected to the charging power output circuit 10802 and the microcontroller 106. The third transistor switch 10808 is electrically connected to the charging power output circuit 10802 and the microcontroller 106. The first resistor 10810 is electrically connected to the first transistor switch 10804. The second resistor 10812 is electrically connected to the second transistor switch 10806. The third resistor 10814 is electrically connected to the third transistor switch 10808.

The input side universal serial bus interface 102 sends the bus voltage 206 to the charging power output circuit 10802. The charging power output circuit 10802 does not detect the first resistor 10810 if the microcontroller 106 turns off the first transistor switch 10804. The charging power output circuit 10802 does not detect the second resistor 10812 if the microcontroller 106 turns off the second transistor switch 10806. The charging power output circuit 10802 does not detect the third resistor 10814 if the microcontroller 106 turns off the third transistor switch 10808.

The charging power output circuit 10802 detects the first resistor 10810 to obtain a first resistance of the first resistor 10810 if the microcontroller 106 turns on the first transistor switch 10804. The charging power output circuit 10802 detects the second resistor 10812 to obtain a second resistance of the second resistor 10814 if the microcontroller 106 turns on the second transistor switch 10806. The charging power output circuit 10802 detects the third resistor 10814 to obtain a third resistance of the third resistor 10814 if the microcontroller 106 turns on the third transistor switch 10808.

The microcontroller 106 informs the first charging power output unit 108 of a current value of the first charging power 208 by turning on or off the first transistor switch 10804, the second transistor switch 10806 and the third transistor switch 10808 by the microcontroller 106. For examples, the microcontroller 106 turns on the first transistor switch 10804 and the second transistor switch 10806 but turns off the third transistor switch 10808, so that the first charging power output unit 108 is aware that the first charging power 208 shall be 1 ampere. The microcontroller 106 turns on the first transistor switch 10804 but turns off the second transistor switch 10806 and the third transistor switch 10808, so that the first charging power output unit 108 is aware that the first charging power 208 shall be 1.5 amperes.

Figure 3:
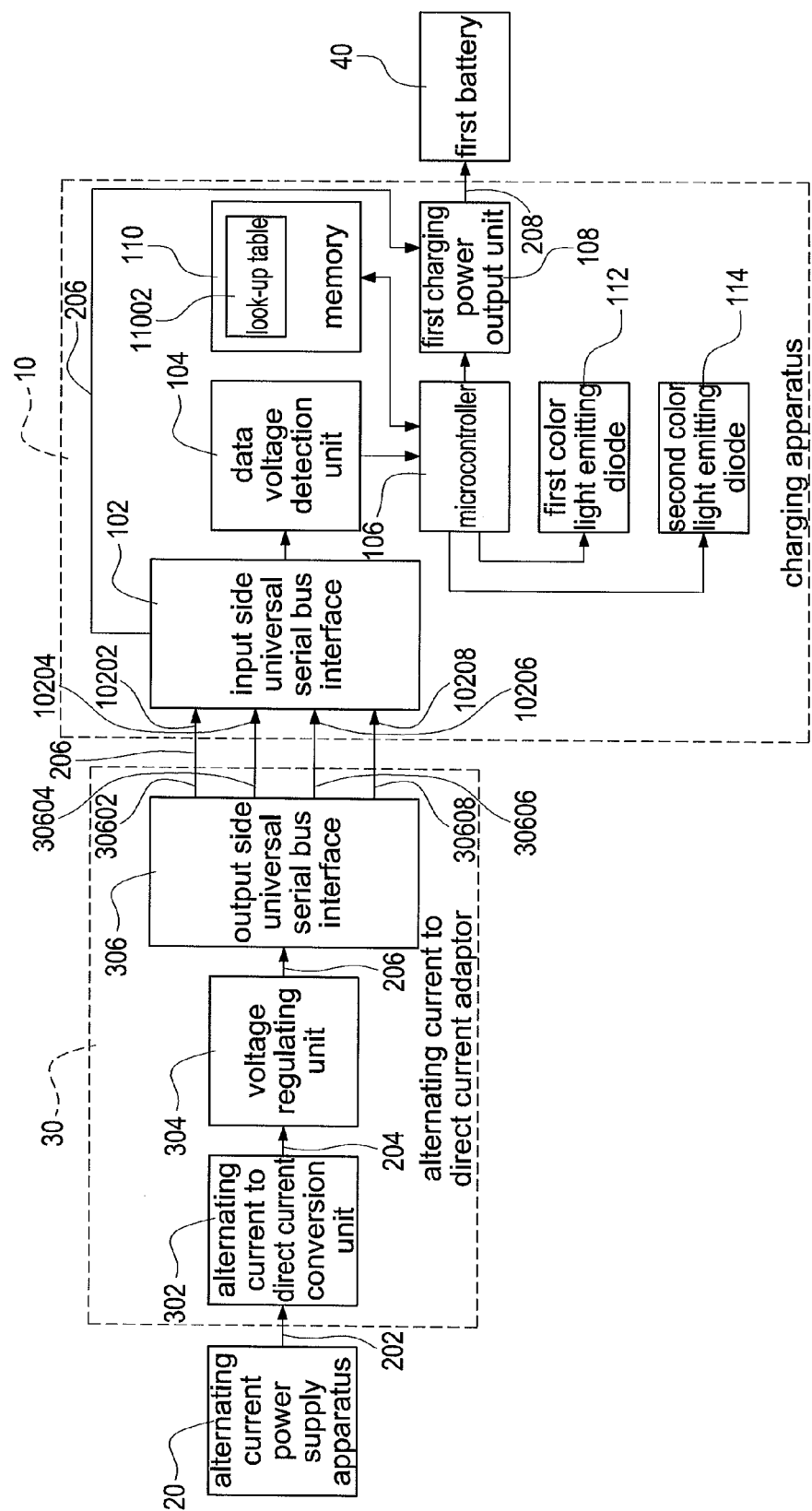
FIG. 3 shows a block diagram of the second embodiment of the charging apparatus of the present invention.

FIG. 3 shows a block diagram of the second embodiment of the charging apparatus of the present invention. The description for the elements shown in FIG. 3, which are similar to those shown in FIG. 2, is not repeated here for brevity. The charging apparatus 10 further comprises a memory 110, a first color light emitting diode 112 and a second color light emitting diode 114. The memory 110 comprises a look-up table 11002.

The memory 110 is electrically connected to the microcontroller 106. The first color light emitting diode 112 is electrically connected to the microcontroller 106. The second color light emitting diode 114 is electrically connected to the microcontroller 106. The microcontroller 106 is configured to look up the look-up table 11002 to determine the overall output charging power of the charging apparatus 10 according to the data positive contact voltage condition and the data negative contact voltage condition.

The microcontroller 106 drives the first color light emitting diode 112 for lighting when the first battery 40 is charged with the first charging power 208. The microcontroller 106 stops driving the first color light emitting diode 112 and drives the second color light emitting diode 114 for lighting when the first battery 40 has been fully charged with the first charging power 208.

Figure 4:
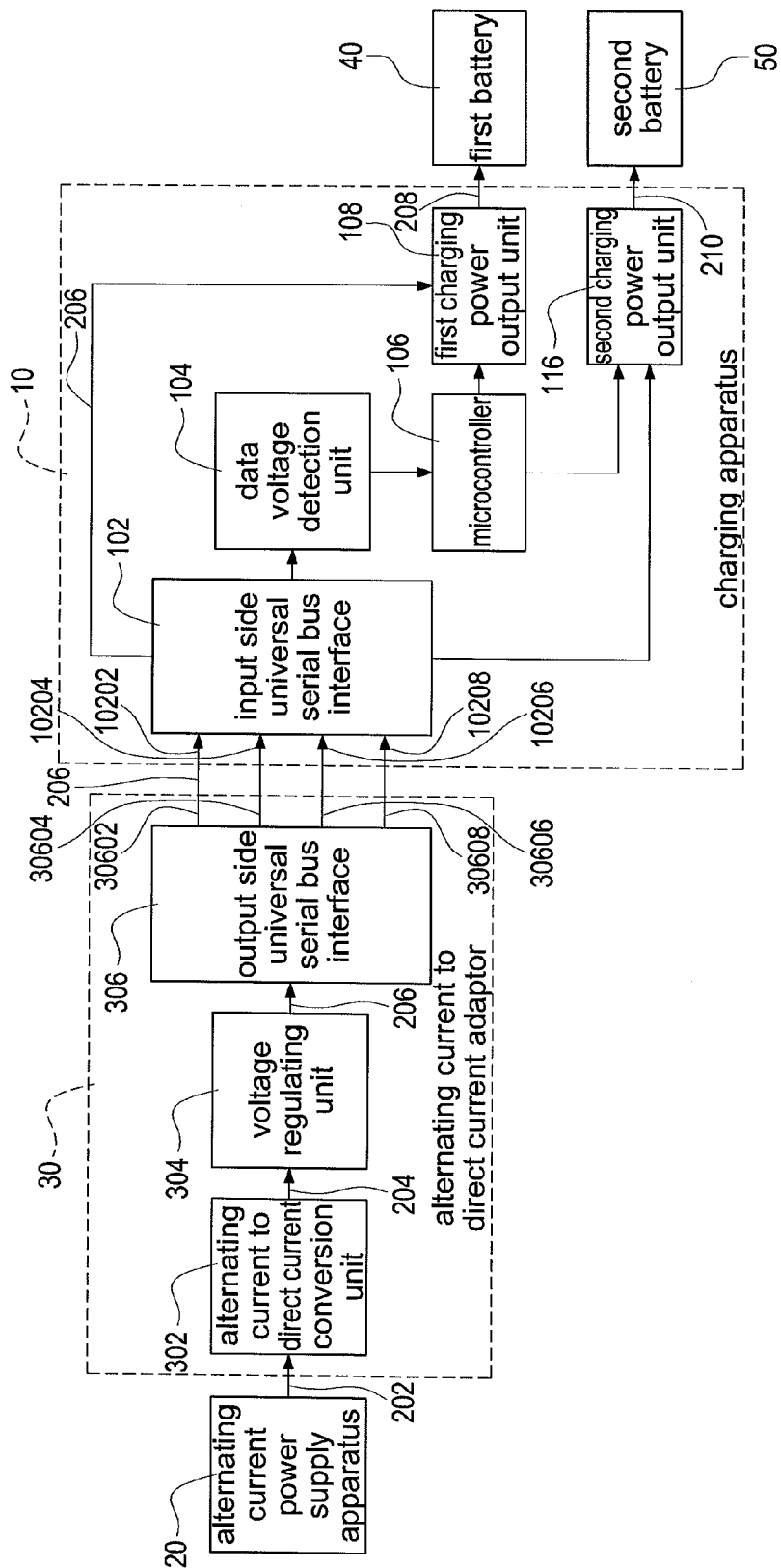
FIG. 4 shows a block diagram of the third embodiment of the charging apparatus of the present invention.

FIG. 4 shows a block diagram of the third embodiment of the charging apparatus of the present invention. The description for the elements shown in FIG. 4, which are similar to those shown in FIGS. 2~3, is not repeated here for brevity. The charging apparatus 10 is further applied to a second battery 50. The charging apparatus 10 further comprises a second charging power output unit 116 electrically connected to the input side universal serial bus interface 102, the microcontroller 106 and the second battery 50.

The input side universal serial bus interface 102 sends the bus voltage 206 to the first charging power output unit 108 and the second charging power output unit 116. The circuit of the second charging power output unit 116 is the same with the circuit (as shown in FIG. 6) of the first charging power output unit 108. Therefore, the circuit of the second charging power output unit 116 is not repeated here for brevity.

The microcontroller 106 is configured to control the second charging power output unit 116 to output a second charging power 210 to the second battery 50 after the second charging power output unit 116 receives the bus voltage 206. The second battery 50 is charged with the second charging power 210. The first charging power 208 is equal to the second charging power 210. The first charging power 208 added to the second charging power 210 makes the overall output charging power.

Figure 7:
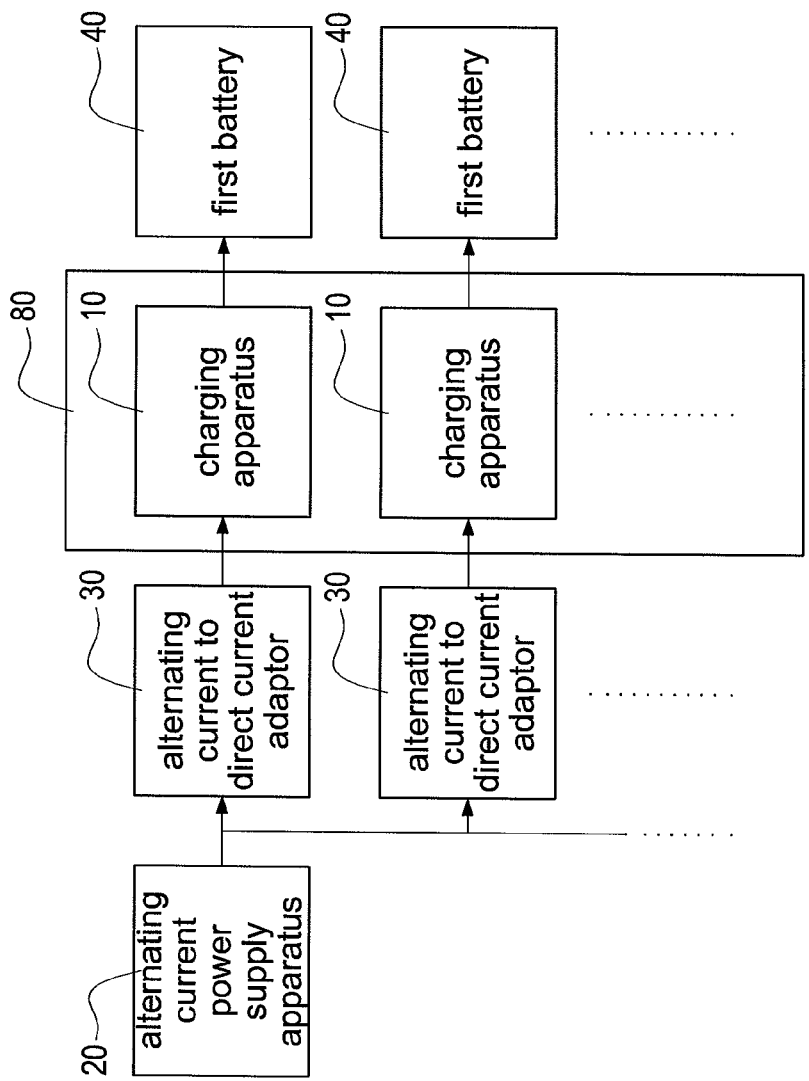
FIG. 7 shows a block diagram of the fourth embodiment of the charging apparatus of the present invention.

FIG. 7 shows a block diagram of the fourth embodiment of the charging apparatus of the present invention. The description for the elements shown in FIG. 7, which are similar to those shown in FIGS. 2~4, is not repeated here for brevity. A plurality of the charging apparatuses 10 can be arranged in a casing 80.

Figure 5:
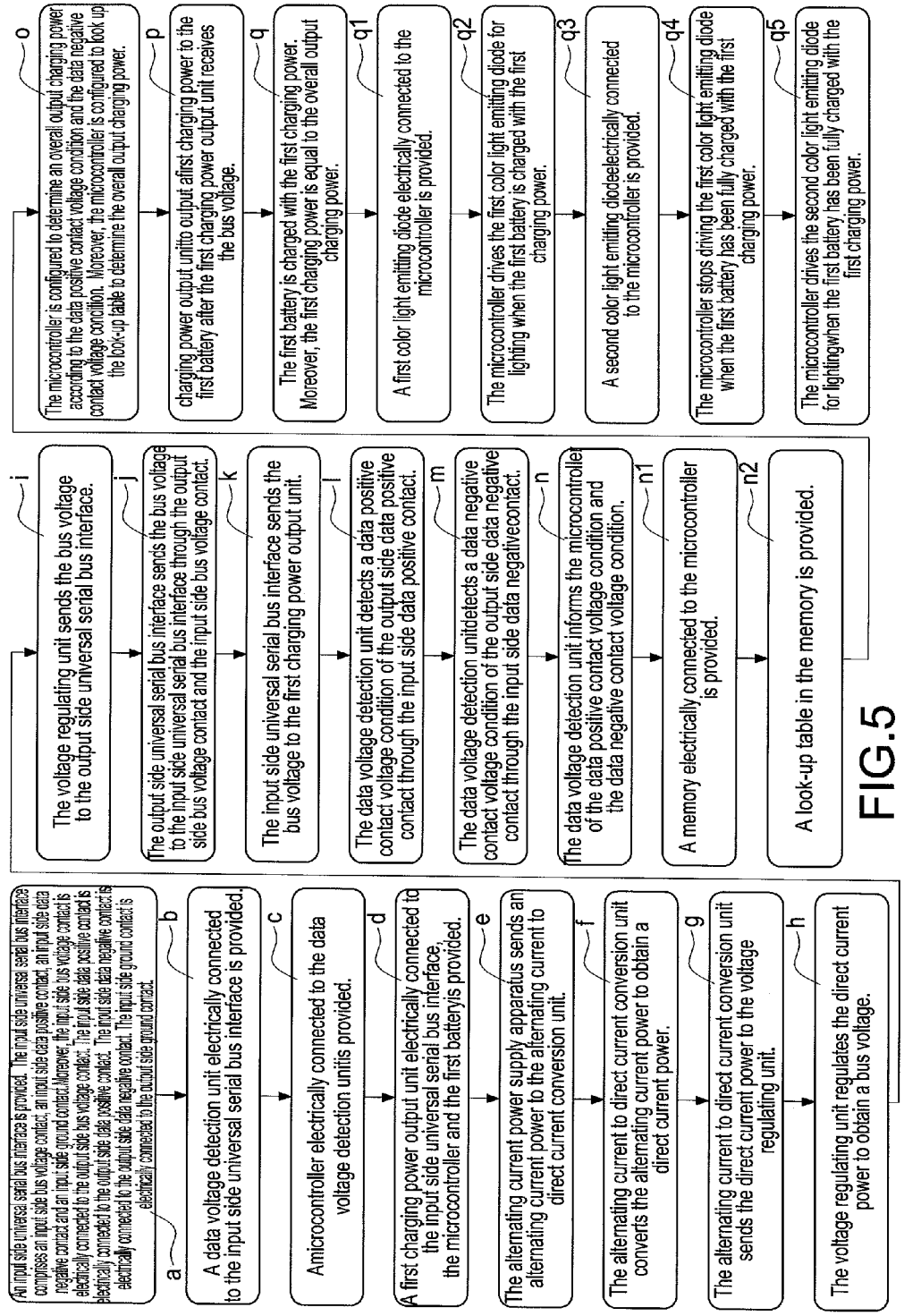
FIG. 5 shows a flow chart of the charging method of the present invention.

FIG. 5 shows a flow chart of the charging method of the present invention. A charging method for recognizing an adaptor (an alternating current to direct current adaptor) is applied to an alternating current power supply apparatus, the alternating current to direct current adaptor and a first battery. The alternating current to direct current adaptor comprises an alternating current to direct current conversion unit, a voltage regulating unit and an output side universal serial bus interface. The alternating current to direct current conversion unit is electrically connected to the alternating current power supply apparatus and the voltage regulating unit. The output side universal serial bus interface is electrically connected to the voltage regulating unit. The output side universal serial bus interface comprises an output side bus voltage contact, an output side data positive contact, an output side data negative contact and an output side ground contact.

The charging method comprises following steps.

Step a: An input side universal serial bus interface is provided. The input side universal serial bus interface comprises an input side bus voltage contact, an input side data positive contact, an input side data negative contact and an input side ground contact. Moreover, the input side bus voltage contact is electrically connected to the output side bus voltage contact. The input side data positive contact is electrically connected to the output side data positive contact. The input side data negative contact is electrically connected to the output side data negative contact. The input side ground contact is electrically connected to the output side ground contact.

Step b: A data voltage detection unit electrically connected to the input side universal serial bus interface is provided.

Step c: A microcontroller electrically connected to the data voltage detection unit is provided.

Step d: A first charging power output unit electrically connected to the input side universal serial bus interface, the microcontroller and the first battery is provided.

Step e: The alternating current power supply apparatus sends an alternating current power to the alternating current to direct current conversion unit.

Step f: The alternating current to direct current conversion unit converts the alternating current power to obtain a direct current power.

Step g: The alternating current to direct current conversion unit sends the direct current power to the voltage regulating unit.

Step h: The voltage regulating unit regulates the direct current power to obtain a bus voltage.

Step i: The voltage regulating unit sends the bus voltage to the output side universal serial bus interface.

Step j: The output side universal serial bus interface sends the bus voltage to the input side universal serial bus interface through the output side bus voltage contact and the input side bus voltage contact.

Step k: The input side universal serial bus interface sends the bus voltage to the first charging power output unit.

Step l: The data voltage detection unit detects a data positive contact voltage condition of the output side data positive contact through the input side data positive contact.

Step m: The data voltage detection unit detects a data negative contact voltage condition of the output side data negative contact through the input side data negative contact.

Step n: The data voltage detection unit informs the microcontroller of the data positive contact voltage condition and the data negative contact voltage condition.

Step n1: A memory electrically connected to the microcontroller is provided.

Step n2: A look-up table in the memory is provided.

Step o: The microcontroller is configured to determine an overall output charging power according to the data positive contact voltage condition and the data negative contact voltage condition. Moreover, the microcontroller is configured to look up the look-up table to determine the overall output charging power.

Step p: The microcontroller is configured to control the first charging power output unit to output a first charging power to the first battery after the first charging power output unit receives the bus voltage.

Step q: The first battery is charged with the first charging power. Moreover, the first charging power is equal to the overall output charging power.

Step q1: A first color light emitting diode electrically connected to the microcontroller is provided.

Step q2: The microcontroller drives the first color light emitting diode for lighting when the first battery is charged with the first charging power.

Step q3: A second color light emitting diode electrically connected to the microcontroller is provided.

Step q4: The microcontroller stops driving the first color light emitting diode when the first battery has been fully charged with the first charging power.

Step q5: The microcontroller drives the second color light emitting diode for lighting when the first battery has been fully charged with the first charging power.

The overall output charging power is 1 ampere when the data positive contact voltage condition is 2 volts and the data negative contact voltage condition is 2.7 volts. The overall output charging power is 2 amperes when the data positive contact voltage condition is 2.7 volts and the data negative contact voltage condition is 2 volts. The overall output charging power is 2.4 amperes when the data positive contact voltage condition is 2.7 volts and the data negative contact voltage condition is 2.7 volts. The overall output charging power is 0.5 ampere when the data positive contact voltage condition and the data negative contact voltage condition are short circuits.

The description for the charging method of the present invention, which is similar to those shown in above Figs. or content, is not repeated here for brevity.

The advantage of the present invention is to recognize the kind of the alternating current to direct current adaptor to determine the overall output charging power of the charging apparatus. Different kinds of alternating current to direct current adaptors have different specifications and performance. Therefore, when different kinds of alternating current to direct current adaptors supply power to the charging apparatus, the charging apparatus shall output different overall output charging power to charge the battery, so that the charging apparatus is protected and the battery is charged safely. Moreover, the charging apparatus can charge a plurality of batteries at the same time, and the charging power for each battery is the same, and the sum of the charging power of each battery is equal to the overall output charging power.

Moreover, the output charging power mentioned above is the output charging current.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A charging apparatus for recognizing an alternating current to direct current adaptor, the charging apparatus applied to the alternating current to direct current adaptor and a first battery, the charging apparatus comprising:
    an input side universal serial bus interface comprising an input side bus voltage contact, an input side data positive contact, an input side data negative contact and an input side ground contact;
    a data voltage detection unit electrically connected to the input side universal serial bus interface;
    a microcontroller electrically connected to the data voltage detection unit; and
    a first charging power output unit electrically connected to the input side universal serial bus interface, the microcontroller and the first battery,
    wherein the alternating current to direct current adaptor sends a bus voltage to the input side universal serial bus interface; the input side universal serial bus interface sends the bus voltage to the first charging power output unit;
    wherein the data voltage detection unit detects a data positive contact voltage condition of the alternating current to direct current adaptor through the input side data positive contact; the data voltage detection unit detects a data negative contact voltage condition of the alternating current to direct current adaptor through the input side data negative contact; the data voltage detection unit informs the microcontroller of the data positive contact voltage condition and the data negative contact voltage condition;
    wherein the microcontroller determines an overall output charging power of the charging apparatus according to the data positive contact voltage condition and the data negative contact voltage condition; the microcontroller is configured to control the first charging power output unit to output a first charging power to the first battery after the first charging power output unit receives the bus voltage; the first battery is charged with the first charging power; the first charging power is equal to the overall output charging power.

2. The charging apparatus in claim 1, wherein the first charging power output unit comprises:
    a charging power output circuit electrically connected to the input side universal serial bus interface and the first battery;
    a first transistor switch electrically connected to the charging power output circuit and the microcontroller;
    a second transistor switch electrically connected to the charging power output circuit and the microcontroller;
    a third transistor switch electrically connected to the charging power output circuit and the microcontroller;
    a first resistor electrically connected to the first transistor switch;
    a second resistor electrically connected to the second transistor switch; and
    a third resistor electrically connected to the third transistor switch.

3. The charging apparatus in claim 2, further comprising a memory electrically connected to the microcontroller, wherein the memory comprises a look-up table; the microcontroller is configured to look up the look-up table to determine the overall output charging power of the charging apparatus according to the data positive contact voltage condition and the data negative contact voltage condition.

4. The charging apparatus in claim 3, further comprising:
    a first color light emitting diode electrically connected to the microcontroller; and
    a second color light emitting diode electrically connected to the microcontroller,
    wherein the microcontroller drives the first color light emitting diode for lighting when the first battery is charged with the first charging power; the microcontroller stops driving the first color light emitting diode and drives the second color light emitting diode for lighting when the first battery has been fully charged with the first charging power.

5. The charging apparatus in claim 1, wherein the overall output charging power is 1 ampere when the data positive contact voltage condition is 2 volts and the data negative contact voltage condition is 2.7 volts; the overall output charging power is 2 amperes when the data positive contact voltage condition is 2.7 volts and the data negative contact voltage condition is 2 volts; the overall output charging power is 2.4 amperes when the data positive contact voltage condition is 2.7 volts and the data negative contact voltage condition is 2.7 volts; the overall output charging power is 0.5 ampere when the data positive contact voltage condition and the data negative contact voltage condition are short circuits.

6. A charging method for recognizing an alternating current to direct current adaptor, the charging method applied to the alternating current to direct current adaptor and a first battery, the charging method comprising:
    a. providing an input side universal serial bus interfaced, wherein the input side universal serial bus interface comprises an input side bus voltage contact, an input side data positive contact, an input side data negative contact and an input side ground contact;
    b. providing a data voltage detection unit electrically connected to the input side universal serial bus interface;
    c. providing a microcontroller electrically connected to the data voltage detection unit;

d. providing a first charging power output unit electrically connected to the input side universal serial bus interface, the microcontroller and the first battery;

e. sending a bus voltage to the input side universal serial bus interface by the alternating current to direct current adaptor;

f. sending the bus voltage to the first charging power output unit by the input side universal serial bus interface;

g. detecting a data positive contact voltage condition of the alternating current to direct current adaptor through the input side data positive contact by the data voltage detection unit;

h. detecting a data negative contact voltage condition of the alternating current to direct current adaptor through the input side data negative contact by the data voltage detection unit;

i. informing the microcontroller of the data positive contact voltage condition and the data negative contact voltage condition by the data voltage detection unit;

j. determining an overall output charging power by the microcontroller according to the data positive contact voltage condition and the data negative contact voltage condition;

k. controlling the first charging power output unit to output a first charging power to the first battery by the microcontroller after the first charging power output unit receives the bus voltage; and l. charging the first battery with the first charging power, wherein the first charging power is equal to the overall output charging power.

7. The charging method in claim 6, after step i further comprising:

i1. providing a memory electrically connected to the microcontroller; and i2. providing a look-up table in the memory, wherein in the step j, the microcontroller is configured to look up the look-up table to determine the overall output charging power.

8. The charging method in claim 7, after step l further comprising:

m. providing a first color light emitting diode electrically connected to the microcontroller; and n. driving the first color light emitting diode for lighting by the microcontroller when the first battery is charged with the first charging power.

9. The charging method in claim 8, after step n further comprising:

o. providing a second color light emitting diode electrically connected to the microcontroller;

p. stopping driving the first color light emitting diode by the microcontroller when the first battery has been fully charged with the first charging power; and q. driving the second color light emitting diode for lighting by the microcontroller when the first battery has been fully charged with the first charging power.

10. The charging method in claim 9, wherein the overall output charging power is 1 ampere when the data positive contact voltage condition is 2 volts and the data negative contact voltage condition is 2.7 volts; the overall output charging power is 2 amperes when the data positive contact voltage condition is 2.7 volts and the data negative contact voltage condition is 2 volts; the overall output charging power is 2.4 amperes when the data positive contact voltage condition is 2.7 volts and the data negative contact voltage condition is 2.7 volts; the overall output charging power is 0.5 ampere when the data positive contact voltage condition and the data negative contact voltage condition are short circuits.

* * * * *